United States Patent [19]

Hering et al.

[11] 3,960,459

[45] June 1, 1976

[54] REDUCED SHEAR STRESS END FITTING

[75] Inventors: Frederic S. Hering, Chesapeake, Va.; Robert H. Ohlbaum, Silver Spring; Joseph R. Crisci, Bowie, both of Md.

[73] Assignee: The United States of America as represented by the Secretary of the Navy, Washington, D.C.

[22] Filed: June 6, 1974

[21] Appl. No.: 476,821

Related U.S. Application Data

[63] Continuation-in-part of Ser. No. 239,478, March 30, 1972, abandoned.

[52] U.S. Cl. ............................... 403/267; 403/268; 403/291; 403/344
[51] Int. Cl.² ..................... B25G 3/34; F16B 11/00; F16B 12/04; F16L 13/00
[58] Field of Search .......... 403/265, 266, 267, 268, 403/272, 291, 360, 361, 344, 374; 52/230

[56] References Cited
UNITED STATES PATENTS 2,463,144   3/1949   Buchanan ...................... 403/369 X
2,618,147   11/1952  Freyssinet ........................... 52/230
2,874,938   2/1959   Higgins .............................. 403/265
3,139,032   6/1964   Silverstein .......................... 403/268
3,854,768   12/1974  King ............................. 403/371 X

FOREIGN PATENTS OR APPLICATIONS 1,115,054   11/1955   France ................................. 52/230

*Primary Examiner*—Werner H. Schroeder
*Assistant Examiner*—Wayne L. Shedd
*Attorney, Agent, or Firm*—R. S. Sciascia; Q. E. Hodges

[57] ABSTRACT

An end fitting for a hawser which reduces the shear stresses generated within the hawser. The hawser is embedded in a tapered plug, which fits within a complementary member which does not surround the tapered plug for its full axial length. As a result of this geometry, the shear stress which results from the combined tensile and compressive stresses within the hawser and plug is reduced thereby allowing a greater tensile load to be exerted upon the hawser.

5 Claims, 2 Drawing Figures

REDUCED SHEAR STRESS END FITTING

The invention described herein may be manufactured and used by or for the Government of the U.S.A for governmental purposes without the payment of any royalties thereon or therefor.

The present application is a continuation-in-part of copending application Ser. No. 239,478, filed Mar. 30, 1972, now abandoned.

BACKGROUND OF THE INVENTION

A common method of attaching a hawser to a fitting is to embed the hawser in a tapered plug of metal or other castable material and then surround this tapered plug with a member having a complementary tapered surface. The tensile stress in the hawser is uniformly distributed over the surface of the tapered plug, thereby preventing the generation of any localized stresses. In the prior art, the member with the complementary tapered surface surrounds the tapered plug for its full axial length; that is, the member extends to the minimum diameter of the hawser-plug combination, which is the diameter of the hawser.

However, it has been found that such a fitting does not allow the hawser to exert its full tensile strength. For example, a hawser or other tensile member having a rated tensile strength of 50,000 lbs., when fixed in the prior art fitting of this type will be found to break at a tensile load considerably less than 50,000 lbs. It has been found that the normal point of failure of such a hawser is at the minimum diameter of the hawser-plug combination. That is, the hawser will fail at that point where it enters the tapered plug.

Applicants have analyzed the above types of failure and have found that they are caused by the combined stresses within the hawser-plug combination. The present invention is an end fitting which prevents the build-up of these combined stresses within the hawser-plug combination.

SUMMARY OF THE INVENTION

Briefly, the present invention comprises a hawser having a tapered plug on its end which fits within a restraining member having a complementary tapered surface. The restraining member does not extend the full length of the tapered plug; the minimum diameter of the complementary tapered surface is considerably greater than the diameter of the hawser. As a result of this the tensile stress in the hawser-plug combination at this plane is considerably less than it would be if the complementary tapered surface extended to the hawser diameter. When this tensile stress is combined with the compressive stress generated by the complementary tapered surface, the resulting stress is found to be less than that in the conventional prior art end fitting. Since this combined stress or shear stress is what causes failure in the prior art hawsers, the present end fitting allows a given hawser to withstand a greater tensile force than prior art end fittings.

OBJECT OF THE INVENTION

Accordingly, it is an object of the present invention to provide an end fitting for a tensile member which allows the tensile member to exert its full rated load.

It is a further object of the present invention to provide and end fitting of the above type which does not require any compound curves on its mating parts.

It is a further object of the present invention to provide and end fitting of the above type which can be easily assembled at its point of intended use.

Other objects and advantages of the present invention will be apparent from the following specification and accompanying drawings.

DESCRIPTION OF THE PREFERRED EMBODIMENT

The present invention will be described as an end fitting for a towing hawser for a ship; however, it will be obvious that it can be used as an end fitting for any type of tensile member.

Figure 1:
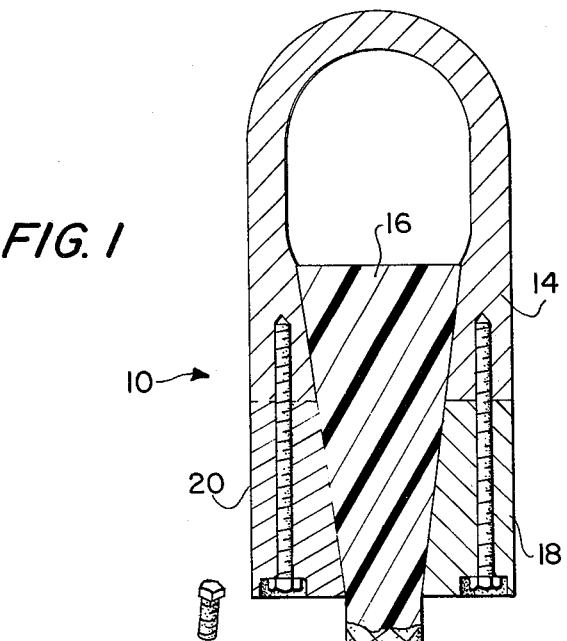
FIG. 1 shows a cross section of the end fitting of the present invention as it is being prepared for use.

FIG. 1 shows the end fitting 10 of the present invention being assembled to a hawser 12. It is comprised of a restraining member or "basket" 14, and a tapered plug 16 which fits in basket 14. Tapered plug 16 comprises a metal or other castable material which is cast around hawser 12. During casting, mold halves 18 and 20 are fastened in place as shown in FIG. 1 and then removed as shown in FIG. 2.

Figure 2:
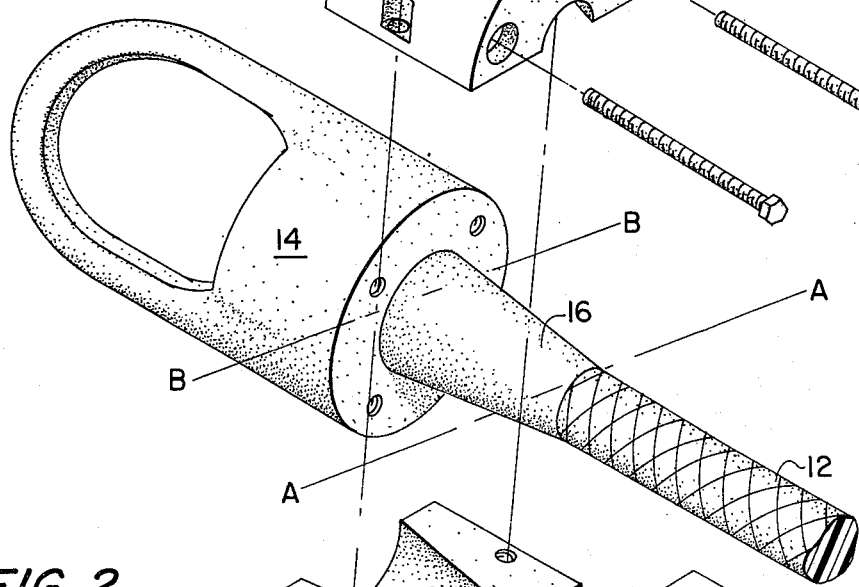
FIG. 2 shows the end fitting of the present invention attached to a hawser and ready for use.

FIG. 2 shows the end fitting ready for use. As can be seen, mold halves 18 and 20 are removed and basket 14 does not extend the full axial length of tapered plug 16.

The ability of hawser 12 to exert its rated tensile load results from the fact that basket 14 does not extend to plane AA of FIG. 2 but rather ends at plane BB of FIG. 2. Applicants analyzed the stresses in a hawser having an end fitting which extended to plane AA and found that such a fitting generated an extreme shear stress within the hawser at plane AA. This was done with the use of the well known Mohr's circle. Mohr's circle, as is well known, is used to combine two stresses in different planes to find the total stress at a particular plane.

Since the hawser in prior art end fittings failed at plane AA in FIG. 2, applicants analyzed the stresses at that point to determine the cause of the failures. The tensile stress in hawser 12 at plane AA is found by dividing the load on the hawser by the diameter of the hawser at that point. The compressive stress on hawser-plug combination 16 is found by dividing the normal load on the hawser-plug combination by its area of contact with basket 14. It will be found that the tensile stress in the hawser is considerably greater than the compressive stress against the hawser-plug combination, and that when this stress is plotted on a Mohr's circle diagram it is the principal component of the combined stresses. Therefore, in order to reduce the combined stresses on the hawser-plug combination, applicants terminated basket 14 at a point where its minimum diameter considerably exceeds the diameter of the hawser at plane AA. Since the tensile load in the hawser-plug combination at plane BB is the same as the load at plane AA, the stress per unit area at plane BB is considerably less than that at plane AA due to the increased cross-sectional area of the hawser-plug combination at plane BB. Of course, the axial length of the mating conical surface of basket 14 must be kept constant in order to keep the compressive load on the hawser-plug combination a constant. When the tensile stress at plane BB is combined with the compressive stress exerted on the tapered surface of hawser-plug combination 16 on a Mohr's circle diagram, the resulting shear stress is found to be within the limits that can be withstood by hawser 12. The limiting stress then becomes the tensile stress rather than the shear stress.

When the hawser is embedded in the castable material, it can either be left whole or can be unlaid for a short length. Either way is satisfactory for the present invention. The method of embedding the hawser is the same as in the prior art and will not be described here. However, hawser-plug combination 16 is preferably not bonded to basket 14; this allows it to swivel in basket 14, which prevents the hawser from becoming kinked in use.

The type of castable material that is used in the present invention is not critical; however, it should be compatable with the material of the hawser. If the hawser is non-metallic, then a castable epoxy or polyester resin should be used; if the hawser is a wire rope, then a metal such as zinc can be used for the castable material. The composition of basket 14 is likewise not critical; the material used for it will be a function of the application for which the hawser is intended, since basket 14 transmits the force from the hawser to the object being towed.

The surface of tapered plug 16 has a regular taper; that is, when viewed alone it appears to be a truncated circular cone which has straight sides. Likewise the complementary surface of basket 14 has a regular taper which matches that of plug 16. The fact that the mating surfaces have a simple regular taper rather than a compound curve means that basket member 14 is easy and cheap to manufacture. It also means that existing basket members 14 can be used in certain situations, with the addition of mold halves 18 and 20 as shown in the FIGS.

Obviously many modifications and variations of the present invention are possible in light of the above teachings. It is therefore to be understood that within the scope of the appended claims the invention may be practiced otherwise than as specifically described.

What is claimed is:

1. A stranded cable tensile member; a regular truncated conical member molded to one end of said tensile member coaxial with said tensile member and integrally joined thereto; and a separable force-transmitting member having a mating interior conical surface surrounding said conical member for less than the total axial length of said conical member starting at the maximum diameter of said conical member, said force transmitting member having a minimum inner diameter greater than the minimum outer diameter of the tensile member said tensile force being applied over approximately half of the length of the conical member.

2. An assembly as in claim 1 wherein said conical member decreases in size in the direction away from said end.

3. An assembly as in claim 2 wherein said conical member is a hardened matrix with said strands distributed therein.

4. The method of increasing the effective tensile strength of a tensile member, which comprises:

forming a portion of the end of the tensile member in a regular frustoconical shape in a separable mold; and removing a portion of said mold leaving a non-adhering inelastic force-transmitting member surrounding only a part of the frustoconical portion, said inelastic force-transmitting member having a mating interior conical surface whereby the combined stresses are distributed over an cross-sectional area of said tensile member greater than the minimum crosssectional area of said tensile member to cause the load carrying capacity of the tensile member and force transmitting member to approximate the maximum tensile strength of the tensile member.

5. The method of securing a force-transmitting member to a stranded cable tensile member, which comprises:

inserting the ends of the tensile member in a mold having a conical interior surface;

embedding the end of the tensile member in a matrix to produce a regular conical exterior surface mating with the conical surface of the mold; and removing a portion of the mold employed in the step of embedding leaving a separable forcetransmitting member over a portion of the conical surface only to a point where the cross-sectional area of the cone is substantially greater than the minimum cross-sectional area of the tensile member, whereby the stress concentration under load is distributed over a cross-sectional area greater than the cross-sectional area of the tensile member the load carrying capability of the tensile member is maximized.

* * * * *